United States Patent [19]
Yang

[11] Patent Number: 5,686,130
[45] Date of Patent: Nov. 11, 1997

[54] METHOD OF MAKING FROZEN CONFECTION WITH ENCASED WHISTLE

[76] Inventor: Ping Yang, 13879 Silverwood La., Chino Hills, Calif. 91709

[21] Appl. No.: 593,740

[22] Filed: Jan. 29, 1996

[51] Int. Cl.⁶ .................................. A23G 9/00; A23P 1/00
[52] U.S. Cl. .......................... 426/515; 426/104; 426/132; 426/134
[58] Field of Search .................................. 426/515, 524, 426/512, 104, 132, 134, 279, 282, 565

[56] References Cited

U.S. PATENT DOCUMENTS

| | | |
|---|---|---|
| 5,343,710 | 9/1994 | Cathenaut et al. .................... 426/515 |
| 5,352,470 | 10/1994 | Yang ................................... 426/515 |
| 5,374,436 | 12/1994 | White et al. .......................... 426/524 |

Primary Examiner—George Yeung
Attorney, Agent, or Firm—Cislo & Thomas LLP

[57] ABSTRACT

Methods of making a frozen confection with an encased whistle element wherein a first embodiment provides for the formation of a recess to hold the whistle by means of a drill or heated element, which whistle is frozen in place and a plug-like element communicating to the recess is easily removed by reason of the mold configuration. In another embodiment a removeable plug or the like is superpositioned to an open bottom wall mold portion so that once the ingredient filling the mold is frozen, removal of the plug-like member provides for air communication to a recess which is adapted to receive a whistle therein. In another embodiment, a bracket member is used to support a whistle in the formed recess to thereby eliminate freezing of the whistle in the recess so the same is securely fastened within the frozen confection.

9 Claims, 4 Drawing Sheets

METHOD OF MAKING FROZEN CONFECTION WITH ENCASED WHISTLE

RELATION TO OTHER APPLICATIONS

This invention pertains to an improvement in the process of making frozen confections as set forth in application Ser. No. 871,819, filed May 29th, 1992, and now U.S. Pat. 5,352,470, issued Oct. 4, 1994.

FIELD OF THE INVENTION

This invention pertains to several different modes and embodiments of forming frozen confections having encased whistles therein, and is an improvement upon the aforementioned issued patent.

BACKGROUND OF THE INVENTION

With respect to the formation of frozen confections having a novel whistle element therein, the prior methods disclosed in the aforementioned patent suffer in several particulars. Firstly, a problem has arisen with respect to the formation of a hollow passageway which would allow for air to pass therethrough to actuate the whistle element embedded in the frozen confection. The prior art methods as disclosed in the aforementioned patent has necessitated a formation of frozen plug members and other process steps that have been cumbersome to carry out, and the herein disclosed invention overcomes some of those shortcomings, as will be seen as the commentary with respect to the invention proceeds.

The prior art of which the inventor is aware is the prior art as cited in the aforementioned patent in that no other art is known to the inventor relating to the embodiments of the invention disclosed herein.

SUMMARY OF THE INVENTION

In a first embodiment of the invention, a method of making an iced confection with a whistle encased therein is disclosed wherein the mold is formed with what might be termed a peripheral channel of a central cylindrical portion so that when the liquid ingredient is poured into the mold and a recess for the whistle is formed by means of a drill or heating element, removal of the frozen confection from the mold leaves what may be considered a small frangible portion which is easily removed by means of pressure or the like to thereby allow for the passage of air between the frozen popsicle-like confection portions and the whistle entrained therebetween. In a second embodiment, an open bottom-walled portion of the main mold is discontinuous, to allow closing of the mold to hold the liquid ingredient prior to freezing with a removable plug, which is removed after the ingredient is frozen to thereby form a recess which communicates to an air passageway so that the whistle element may be placed in the recess and frozen therein. In still another embodiment, in lieu of freezing the whistle element between the twin, popsicle-like frozen confections, a bracket or the like member is secured to the sticks of the frozen confection to operatively secure the whistle element in position for subsequent use.

Generally one embodiment of the invention is a method of making an iced confection with a whistle inside comprising the following steps, but not necessarily in the order recited:

a) filling a mold with a first ingredient, said mold having an open top, a closed bottom and a generally central hollow cylindrical portion extending from said open top to said closed bottom, said cylindrical portion having an inner and an outer end, said inner end having a circumferential channel thereabout;

b) holding in place at least one generally narrow and elongated support member having one end immersed in said first ingredient in said mold and another end outside said first ingredient;

c) freezing said first ingredient in said mold to produce a first frozen part in the mold and matching the inside contours of said mold and thereby forming a plug-like channeled portion;

d) creating a hollow recess in said first frozen part opposite and adjacent said channeled portion, but not communicating therewith, said recess having a shape to accommodate a whistle element and overlie said plug-like channeled portion;

e) inserting a whistle element into said recess in said first frozen part; injecting a second ingredient peripheral to the circumference of said whistle element and said recess;

f) freezing said first frozen part and said second ingredient to bond said whistle element to said recess;

g) heating said mold with a heated fluid so that said first frozen part with entrained whistle element can be removed and removing said frozen part from said mold;

h) applying pressure to said plug-like channeled portion support to remove the same from the contiguous area adjacent thereto to thereby form an air passageway communicating to said whistle element;

i) and recovering a frozen confection having a whistle element therein capable of having air blown therethrough to produce a whistle sound.

In another embodiment of the invention there is disclosed another method of making an iced confection with a whistle inside comprising the following steps, but not necessarily in the order recited:

a) readying for filling a mold with a first ingredient, said mold having an open top, a mostly closed bottom and a generally central hollow cylindrical portion extending from said open top to said mostly closed bottom, said cylindrical portion having an inner and an outer end, said inner end having an open circumference thereabout;

b) placing a removable plug adjacent and super-positional in fluid tight engagement to the open inner end of said cylindrical portion to thereby form a continuous closed bottom wall of said mold;

c) filling said mold with a first ingredient;

d) holding in place at least one generally narrow and elongated support member having one end immersed in said first ingredient in said mold and another end outside said first ingredient;

e) freezing said first ingredient in said mold to produce a first frozen part in the mold and matching the inside contours of said mold and removable plug and thereby creating a hollow recess having a shape to accommodate a whistle element opposite and adjacent said inner end;

f) removing said removable plug and forming an air passageway communicating to said hollow recess with the inner end of said cylindrical portion of said mold;

g) inserting a whistle element into said hollow recess in said first frozen part; injecting a second ingredient peripheral to the circumference of said whistle element and said recess;

h) freezing said first frozen part and said second ingredient to bond said whistle element to said recess;

i) heating said mold with a heated fluid so that said first frozen part with said entrained whistle element can be removed and removing said frozen part from said mold;

j) and recovering a frozen confection having a whistle element therein capable of having air blown therethrough to produce a whistle sound.

Further disclosed is another embodiment of the invention consisting of a method of making an iced confection with a whistle inside comprising the following steps, but not necessarily in the order recited:

a) readying for filling a mold with a first ingredient, said mold having an open top, a mostly closed bottom and a generally central hollow cylindrical portion extending from said open top to said mostly closed bottom, said cylindrical portion having an inner and an outer end, said inner end having an open circumference thereabout;

b) placing a removable plug adjacent and super-positional in fluid tight engagement to the open inner end of said cylindrical portion to thereby form a continuous closed bottom wall of said mold;

c) filling said mold with a first ingredient;

d) holding in place at least one generally narrow and elongated support member having one end immersed in said first ingredient in said mold and another end outside said first ingredient;

e) freezing said first ingredient in said mold to produce a first frozen part in the mold and matching the inside contours of said mold and removable plug and thereby creating a hollow recess having a shape to accommodate a whistle element opposite and adjacent said inner end;

f) removing said removable plug and forming an air passageway communicating to said hollow recess with the inner end of said cylindrical portion of said mold;

g) providing a bracket member adapted to support a whistle element in secure relationship within said hollow recess and being operatively secured to said at least one generally narrow and elongated support member inserting said bracket member and whistle element into said hollow recess in said first frozen part;

h) heating said mold with a heated fluid so that said first frozen part with said bracket supported whistle element can be removed and removing said frozen part from said mold;

i) and recovering a frozen confection having a whistle element secured therein capable of having air blown therethrough to produce a whistle sound.

DETAILED DESCRIPTION OF THE INVENTION

Reference is made to the aforecited U.S. Pat. No. 5,352, 470, the specification of which is hereby incorporated by reference.

Figure 1:
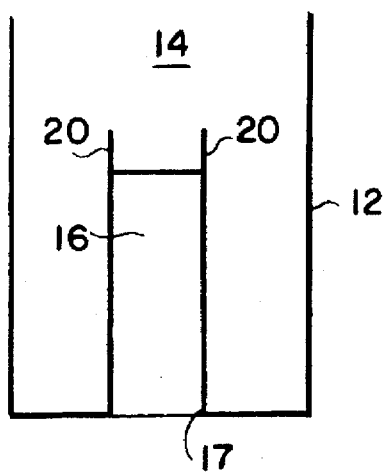
FIG. 1 is a cross-sectional, side elevational view of one of the molds of the invention, showing a circumferential thin-walled portion of a central recess to be formed by the frozen confection.
Figure 2:
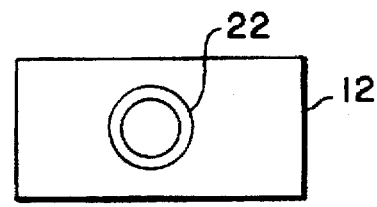
FIG. 2 is a top view of FIG. 1 showing the circumferential recess portion.

Referring specifically to FIGS. 1–9 inclusive of the instant application, wherein like numerals of reference designate like elements throughout, it will be seen that mold 12, with relatively thin walls has an open top defining an interior volume 14 to hold a liquid confection material for freezing. A hollow central portion of mold 12 comprises an upper cylindrical part 16 joined to a lower portion 17 thereby forming what may be considered a constant diameter cylinder and having upper extending circumferential wall portions 20 to thereby form an annulus 22 for purposes that will become apparent and as best seen in FIG. 2.

The thin walled portions 20 forming the annulus 22 are configured in the shape of a bottom peripheral channel 54, for formation of a thin frozen portion or plug-like section of the confection for purposes that will become apparent.

Figure 3:
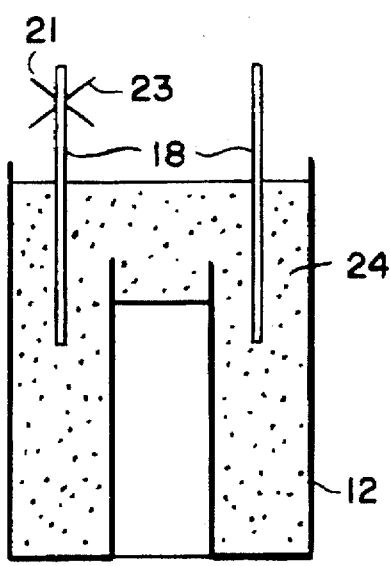
FIG. 3 is a side view of the mold of FIG. 1 showing holding sticks and liquid confection which has been frozen.

FIG. 3 shows the mold 12 with sticks 18 held in place as indicated by the left hand stick via holders 21 and 23 while the liquid confection is poured into the mold 12 and thereafter frozen to produce the frozen confection 24 still retained in the mold 12 with the sticks 18 now rigidly held in place due to the frozen nature of the liquid confection.

Figure 4:
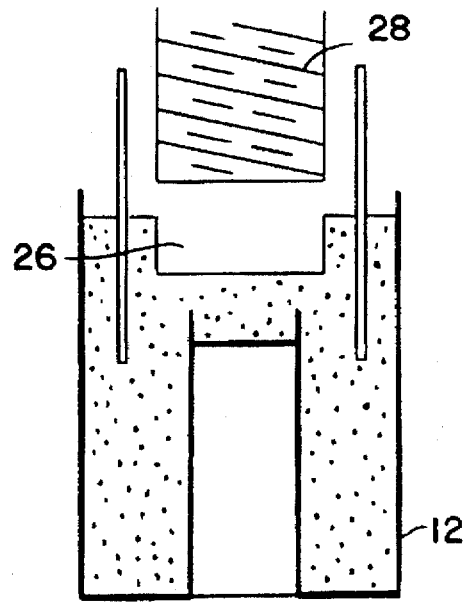
FIG. 4 is a view similar to FIG. 3 showing the drilling or recess-forming step.
Figure 4A:
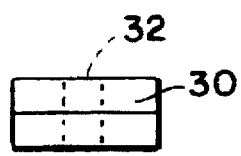
FIG. 4a is a side view of a whistle element used in the invention.

Mold 12 is preferably made of thin walled stainless steel or suitable plastic material. Referring to FIGS. 4 and 4a, the frozen confection is next prepared by forming a whistle receiving recess 26 by means of drill or heated element 28 which when brought into contact with the frozen confection 24 will either bore away or melt same to form the recess 26 of a size and shape to receive the whistle 30, in this particular instance made of candy and having the familiar air passageway 32 therethrough so that when air is blown through the passageway 32 of whistle 30 a whistle sound is produced.

Figure 5:
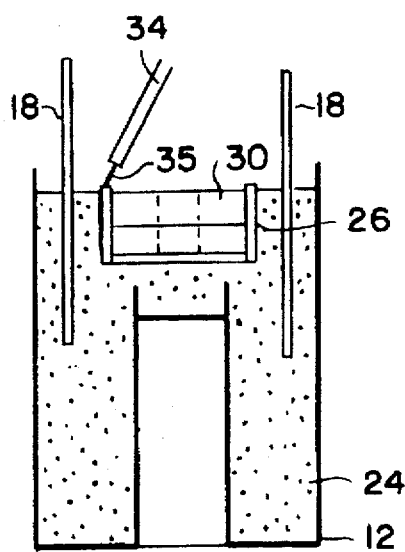
FIG. 5 is another step in the process showing the whistle element being frozen in place.

Referring now to FIG. 5, the whistle 30 is shown in place in the recess 26 and is retained in place by means of additional liquid confection 35 being delivered via liquid confection pipe 34 to fill the space around the whistle and recess 26 and subjecting the entire assemblage to a refreezing process to firmly secure the whistle 30 within recess 26 of frozen confection 24.

Figure 6:
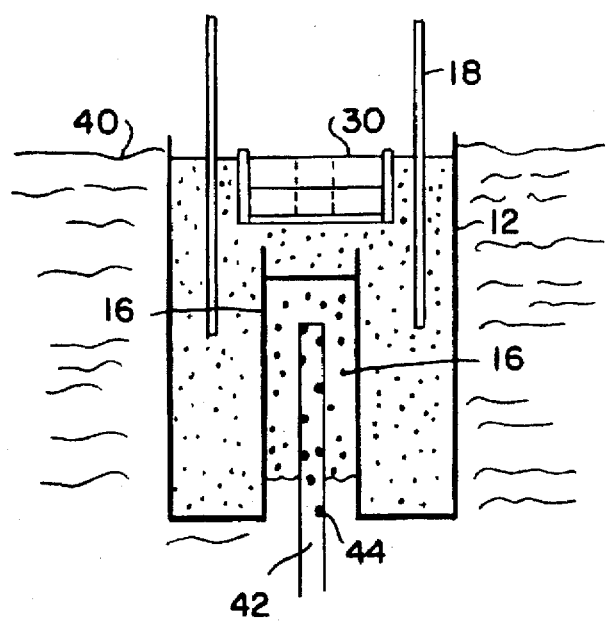
FIG. 6 is a view of the frozen confection with entrained whistle being readied for removal from the mold.
Figure 7:
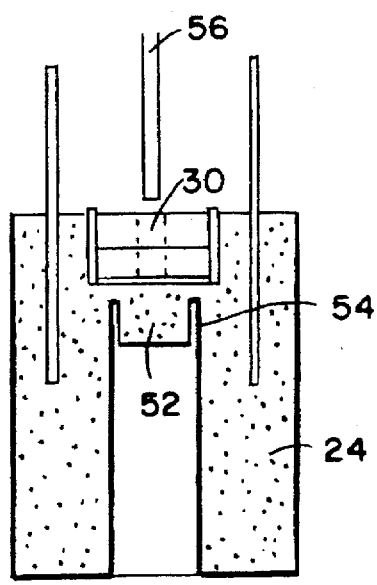
FIG. 7 is the next sequential step showing the plug-like element being readied for removal.
Figure 8:
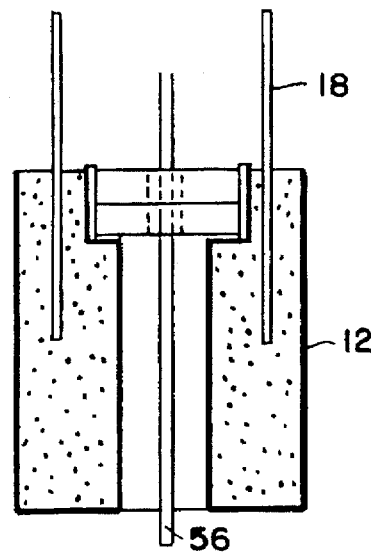
FIG. 8 shows the plug-like element being removed to open up an air passageway for actuation of the whistle.
Figure 8:
Figure 9:
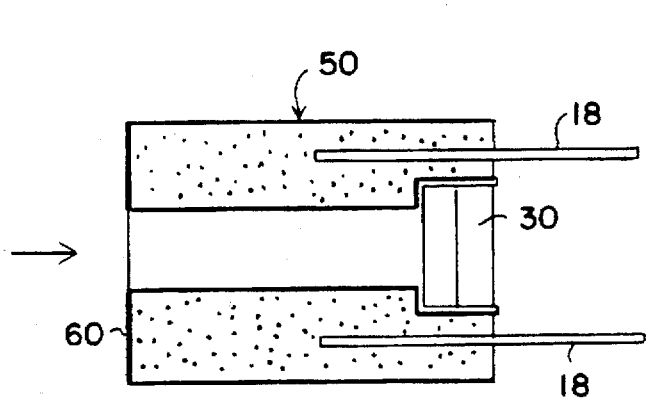
FIG. 9 is a cross-section of the frozen confection showing the finished product.

In order to release the formed confection 24 from mold 12, and referring to FIG. 6, the assemblage is placed in a heated bath 40 of water or air, and subjected to same for a sufficient length of time so as to cause slight melting of the confection 24 adjacent the thin walls of mold 12. To help facilitate the slight thawing process, a heated fluid tube 42 having outlet ports 44 may be inserted into the cylindrical space 16 after which the formed frozen confection 50 is removed from the mold 12, thereby leaving what may be termed a frangible plug-like portion 52 of frozen confection 24 because of the peripheral channel 54 formed around the central cylinder 16. To remove the central frangible portion 52 a push rod or stick 56 is inserted through the whistle passageway 32 to exert force against the frangible portion 52 to thereby break the small web of frozen confection about the peripheral channel 54 and to allow the frangible confection portion 52 to be removed as shown in FIG. 8 to thereby form a completed frozen confection as shown in FIG. 9. The completed frozen confection 50 has an air passageway from the one end of the frozen confection to the other to allow air to be blown from the top part 60 of frozen confection 50 in the direction of the arrow through the whistle 30 and thereby yielding a frozen confection having an entrained whistle element therein which can be made to produce a whistle sound by the individual eating the confection.

Figure 10:
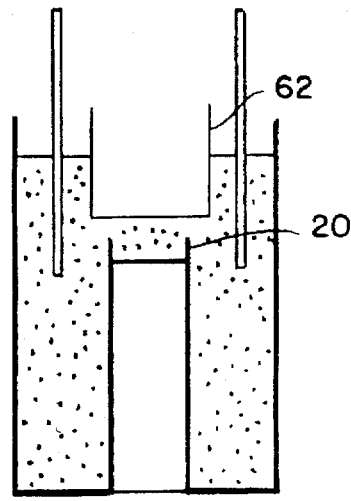
FIG. 10 is a cross-sectional view of the mold and frozen confection of still another embodiment of the practice of the invention.
Figure 11:
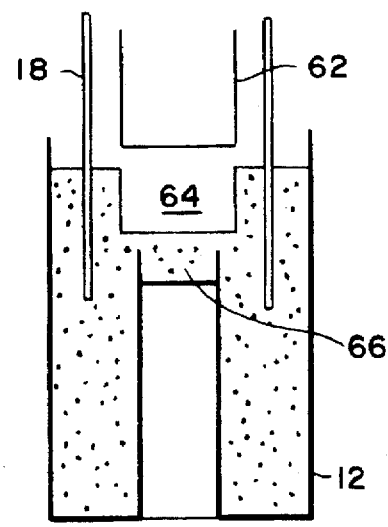
FIG. 11 is a cross-sectional view which shows another step in the FIG. 10 process.

Referring to FIGS. 10 and 11, there is shown an alternative embodiment where instead of utilizing a drill-bit or heater 28 to form the recess to receive the whistle element, a removable plug-like element 62 is positioned and held by means not shown in the mold 12 before the liquid ingredient is poured into the mold and frozen. It is obvious that once the liquid confection is frozen, the removable plug 62 may be removed, thereby forming a recess such as 64 for receiving the whistle element and also thereby forming the frangible plug 66 which may be removed as earlier explained with respect to the FIGS. 7 and 8 embodiment. Hence, the remaining steps as pertains to the earlier embodiment would pertain to this embodiment, the only difference being in the formation of the whistle recess using the removable plug member 62 which is thin walled or the like and coated with an ice or frozen confection releasing ingredient, not shown or alternately being of hollow configuration so that a heated fluid or the like may be injected thereinto to cause slight thawing thereabout to ease the removal of removable plug 62 from the frozen confection contained within mold 12 thereby forming the whistle-receiving recess 64.

Figure 12:
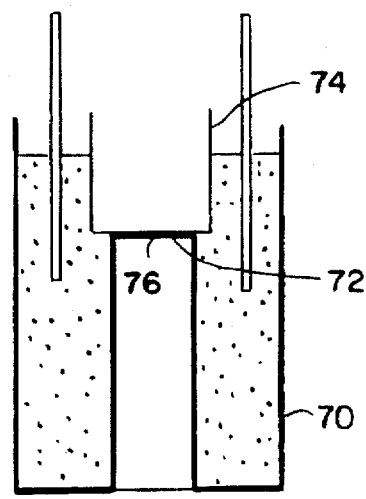
FIG. 12 shows still another embodiment of the practice of the invention.

Referring to FIG. 12, still another embodiment is illustrated, wherein in this particular instance the mold 70 has an open upper portion 72 of the upper cylindrical recess which is central to the mold 70 and the removable plug 74 is placed at the top to form a fluid-tight seal around the cylindrical upper opening 76 so that when liquid confection is poured into the mold 70 same does not spill out or leak out of the central cylindrical opening by reason of the removable plug 74 being in fluid-tight relationship therewith.

Obviously, after the liquid confection is frozen, the removable plug 74 is removed as for the FIG. 10 and 11 embodiment, thereby leaving a recess to receive the whistle for frozen engagement within the recess (as earlier described for the previous embodiments), and obviously there is no frangible portion of the frozen confection that needs to be removed, and thus there is an open channel or passageway between the dual popsicle-like configured frozen confection components to permit blowing of air therebetween, and thence through the whistle to create a whistle sound.

Figure 13:
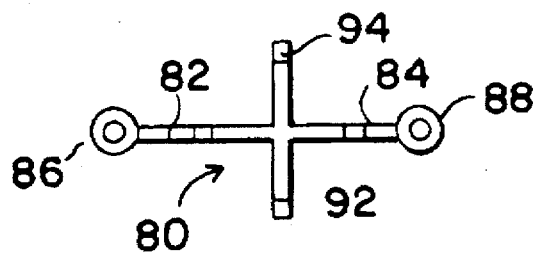
FIG. 13 illustrates a bracket element for retaining a whistle in the air passageway without need of freezing the same therein.
Figure 14:
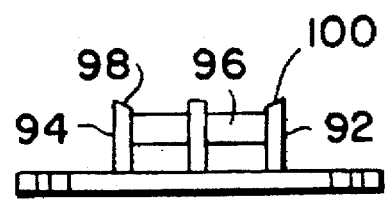
FIG. 14 shows the bracket of FIG. 13 with the whistle secured in the bracket.
Figure 15:
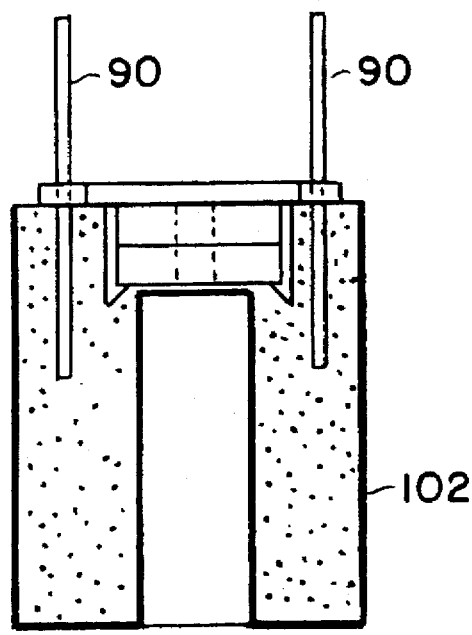
FIG. 15 shows a cross-sectional view of the bracket supporting the whistle from the sticks of the frozen confection.

Still another alternate embodiment is shown in FIGS. 13, 14, and 15. It is seen that a light plastic t-shaped bracket 30 is disclosed, wherein opposing legs 82 and 84 have annular portions 86 and 88 of sufficient diameter to frictionally receive the ends of sticks 90 in secure fashion and wherein opposing legs 92 and 94 of bracket number 80 are configured to receive whistle 96 by reason of the opposed flange-like portions 98 and 100 of legs 94 and 92, engaging in secure relationship the top surface of whistle 96.

Obviously, the whistle 96 in supported relationship to the bracket 80 is secured to the frozen confection 102 by slipping the same onto opposed sticks 90 of confection 102, which has been formed in accordance with the FIG. 12 embodiment, thereby eliminating the need of a second freezing to secure the whistle within the recess of the frozen confection.

The foregoing described invention and the embodiments thereof are not intended to define every possible ramification and modification as such will easily make themselves readily ascertainable to those of ordinary skill in the art, and all such ramifications and modifications are intended to be covered by the appended claims.

As discussed in the aforementioned U.S. Pat. No. 5,352,470, although two sticks in the frozen confection are shown and described, it is self-evident that one would suffice or three might be necessary depending on the particular shape of the finished confection. Similarly, although the whistle element and air passageway are shown and described as cylindrical, it will be appreciated that other shapes are possible. The whistle can be made of sugar or any other suitable material.

Thus, these and other similar modifications and changes will make themselves readily apparent to those of ordinary skill in the art, and are intended to be encompassed by the appended claims.

I claim:

1. A method of making an ice confection with a whistle inside comprising the following steps, but not necessarily in the order recited:

a) filling a mold with a first ingredient, said mold having an open top, a closed bottom and a generally central hollow cylindrical portion extending from said open top to said closed bottom, said cylindrical portion having an inner and an outer end, said inner end having a circumferential channel thereabout;

b) holding in place at least one generally narrow and elongated support member having one end immersed in said first ingredient in said mold and another end outside said first ingredient;

c) freezing said first ingredient in said mold to produce a first frozen part in the mold and matching the inside contours of said mold and thereby forming a plug-like channeled portion;

d) creating a hollow recess in said first frozen part opposite and adjacent said channeled portion, but nor communicating therewith, said recess having a shape to accommodate a whistle element and overlie said plug-like channeled portion;

e) inserting a whistle element into said recess in said first frozen part; injecting a second ingredient peripheral to the circumference of said whistle element and said recess;

f) freezing said first frozen part and said second ingredient to bond said whistle element to said recess;

g) heating said mold with a heated fluid so that said first frozen part with entrained whistle element can be removed and removing said frozen part from said mold;

h) applying pressure to said plug-like channeled portion to remove the same from the contiguous area adjacent thereto to thereby form an air passageway communicating to said whistle element;

whereby a frozen confection having a whistle element therein capable of having air blown therethrough to produce a whistle sound is produced.

2. The method in accordance with claim 1 wherein said first ingredient is flavored.

3. The method in accordance with claim 2 wherein said whistle element has a central aperture through which a rod can be inserted to accomplish step h.

4. The method in accordance with claim 3 wherein the configuration of said mold acting cooperatively with said circumferential channel allows for the formation of said plug-like portion which is frangible with respect to the remainder of said first frozen part.

5. The method in accordance with claim 1 wherein said hollow recess is formed by a drill-like bit to remove material of said first frozen part.

6. The method in accordance with claim 1 wherein said hollow recess is formed by a removable plug superpositioned to said inner end of said cylindrical portion of said mold.

7. The method in accordance with claim 6 when said removable plug is heated to remove same from said first frozen part prior to inserting said whistle element in said hollow recess.

8. A method of making an ice confection with a whistle inside comprising the following steps, but not necessarily in the order recited:

a) providing for filling a mold with a first ingredient, said mold having an open top, a mostly closed bottom and a generally central hollow cylindrical portion extending from said open top to said mostly closed bottom, said cylindrical portion having an inner and an outer end, said inner end having an open circumference thereabout;

b) placing a removable plug adjacent and superpositioned in fluid-tight engagement to the open inner end of said cylindrical portion to thereby form a continuous closed bottom wall of said mold;

c) filling said mold with a first ingredient;

d) holding in place at least one generally narrow and elongated support member having one end immersed in said first ingredient in said mold and another end outside said first ingredient;

e) freezing said first ingredient in said mold to produce a first frozen part in the mold and matching the inside contours of said mold and removable plug and thereby creating a hollow recess having a shape to accommodate a whistle element opposite and adjacent said inner end;

f) removing said removable plug and forming an air passageway communicating to said hollow recess with the inner end of said cylindrical portion of said mold;

g) inserting a whistle element into said hollow recess in said first frozen part; injecting a second ingredient peripheral to the circumference of said whistle element and said recess;

h) freezing said first frozen part and said second ingredient to bond said whistle element within said recess;

i) heating said mold with a heated fluid so that said first frozen part with said entrained whistle element can be removed and removing said frozen part from said mold.

9. A method of making an ice confection with a whistle inside comprising the following steps, but not necessarily in the order recited:

a) providing for filling a mold with a first ingredient, said mold having an open top, a mostly closed bottom and a generally central hollow cylindrical portion extending from said open top to said mostly closed bottom, said cylindrical portion having an inner and an outer end, said inner end having an open circumference thereabout;

b) placing a removable plug adjacent and superpositioned in fluid tight engagement to the open inner end of said cylindrical portion to thereby form a continuous closed bottom wall of said mold;

c) filing said mold with a first ingredient;

d) holding in place at least one generally narrow and elongated support member having one end immersed in said first ingredient in said mold and another end outside said first ingredient;

e) freezing said first ingredient in said mold to produce a first frozen part in the mold and matching the inside contours of said mold and removable plug and thereby creating a hollow recess having a shape to accommodate a whistle element opposite and adjacent said inner end;

f) removing said removable plug and forming an air passageway communicating to said hollow recess with the inner end of said cylindrical portion of said mold;

g) providing a bracket member configured to support a whistle element in secure relationship within said hollow recess and being operatively secured to said at least one generally narrow and elongated support member and inserting said bracket member and whistle element into said hollow recess in said first frozen part;

h) heating said mold with a heated fluid so that said first frozen part with said bracket supported whistle element can be removed and removing said frozen part from said mold.

* * * * *